United States Patent
Sarikaya

(10) Patent No.: US 10,366,690 B1
(45) Date of Patent: Jul. 30, 2019

(54) SPEECH RECOGNITION ENTITY RESOLUTION

(71) Applicant: Amazon Technologies, Inc., Seattle, WA (US)

(72) Inventor: Ruhi Sarikaya, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/595,466

(22) Filed: May 15, 2017

(51) Int. Cl.
| | |
|---|---|
| *G10H 5/00* | (2006.01) |
| *G10L 15/22* | (2006.01) |
| *G10L 25/54* | (2013.01) |
| *G10L 25/69* | (2013.01) |
| *G06F 16/432* | (2019.01) |

(52) U.S. Cl.
CPC ............ *G10L 15/22* (2013.01); *G06F 16/433* (2019.01); *G10L 25/54* (2013.01); *G10L 25/69* (2013.01); *G10H 5/005* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 7,475,015 B2 | 1/2009 | Epstein et al. | |
| 7,966,173 B2 | 6/2011 | Emam et al. | |
| 8,229,729 B2 | 7/2012 | Sarikaya et al. | |
| 9,098,494 B2 | 8/2015 | Sarikaya et al. | |
| 9,367,526 B1 | 6/2016 | Vozila et al. | |
| 9,484,030 B1 * | 11/2016 | Meaney | G10L 15/22 |
| 9,858,927 B2 * | 1/2018 | Williams | G06F 16/68 |
| 9,898,250 B1 * | 2/2018 | Williams | G06F 3/167 |
| 9,972,318 B1 * | 5/2018 | Kelly | G10L 15/22 |
| 10,176,167 B2 * | 1/2019 | Evermann | G06F 17/279 |
| 2008/0270115 A1 | 10/2008 | Emam et al. | |
| 2013/0024403 A1 | 1/2013 | Chen et al. | |
| 2014/0365209 A1 * | 12/2014 | Evermann | G06F 17/279 704/9 |
| 2015/0019216 A1 * | 1/2015 | Singh | G10L 15/183 704/235 |
| 2015/0179170 A1 * | 6/2015 | Sarikaya | G10L 15/22 704/275 |
| 2015/0286747 A1 * | 10/2015 | Anastasakos | G06F 16/9017 707/776 |
| 2017/0011306 A1 | 1/2017 | Kim et al. | |

(Continued)

FOREIGN PATENT DOCUMENTS

| | | |
|---|---|---|
| EP | 2571023 | 3/2015 |
| WO | 2013169530 | 11/2013 |
| WO | 2017007742 | 1/2017 |

*Primary Examiner* — Marcus T Riley
(74) *Attorney, Agent, or Firm* — Pierce Atwood LLP

(57) ABSTRACT

A canonicalizer can be used with or implemented within a natural language understanding (NLU) component of a speech processing system to enable the system to properly identify an entity to which a user refers in a spoken utterance. The canonicalizer may determine a first canonical value using a gazetteer associated with a determined intent of the spoken utterance. The canonicalizer may determine a second canonical value using a look-up table of canonical values. The canonicalizer may then output either the first canonical value or the second canonical value for further NLU processing, such as entity resolution.

20 Claims, 14 Drawing Sheets

(56) References Cited

U.S. PATENT DOCUMENTS

| | | | |
|---|---|---|---|
| 2017/0236512 A1* | 8/2017 | Williams | G06F 16/68 |
| | | | 381/79 |
| 2017/0278514 A1* | 9/2017 | Mathias | G10L 15/22 |
| 2018/0199123 A1* | 7/2018 | Rao | H04R 1/028 |

* cited by examiner

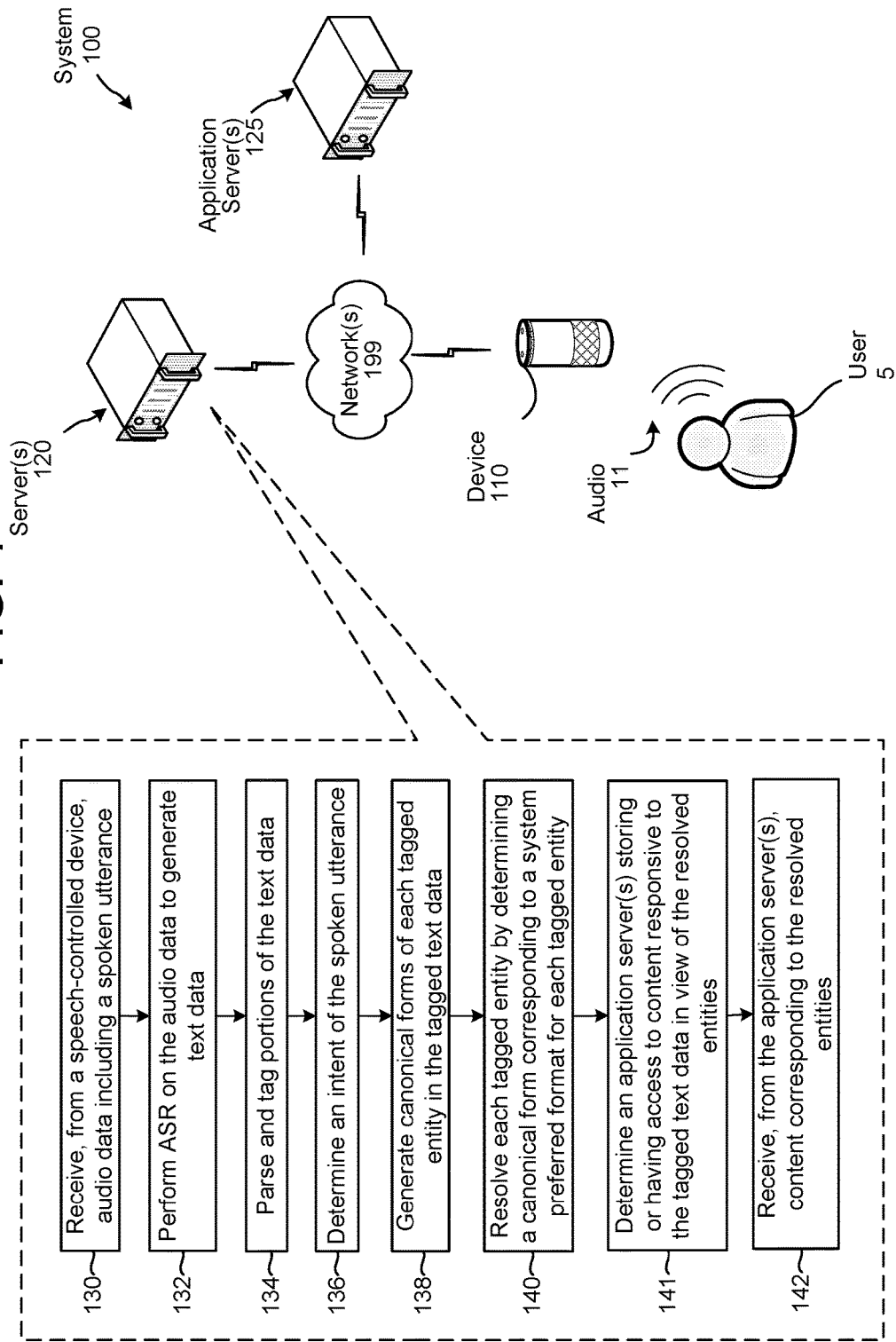

FIG. 2B

| Application Server | ASR Output Entity Value | Application Server Indicated Canonical Form |
|---|---|---|
| Movie service | Harry Potter and the Chamber of Secrets | Chamber of Secrets |
| Banking service | Currency Exchange | Currency Xchange |
| Music service | Marin Morris | Maren Morris |
| Music service | You too | U2 |
| Search engine | edf energy | e.d.f. Energy |

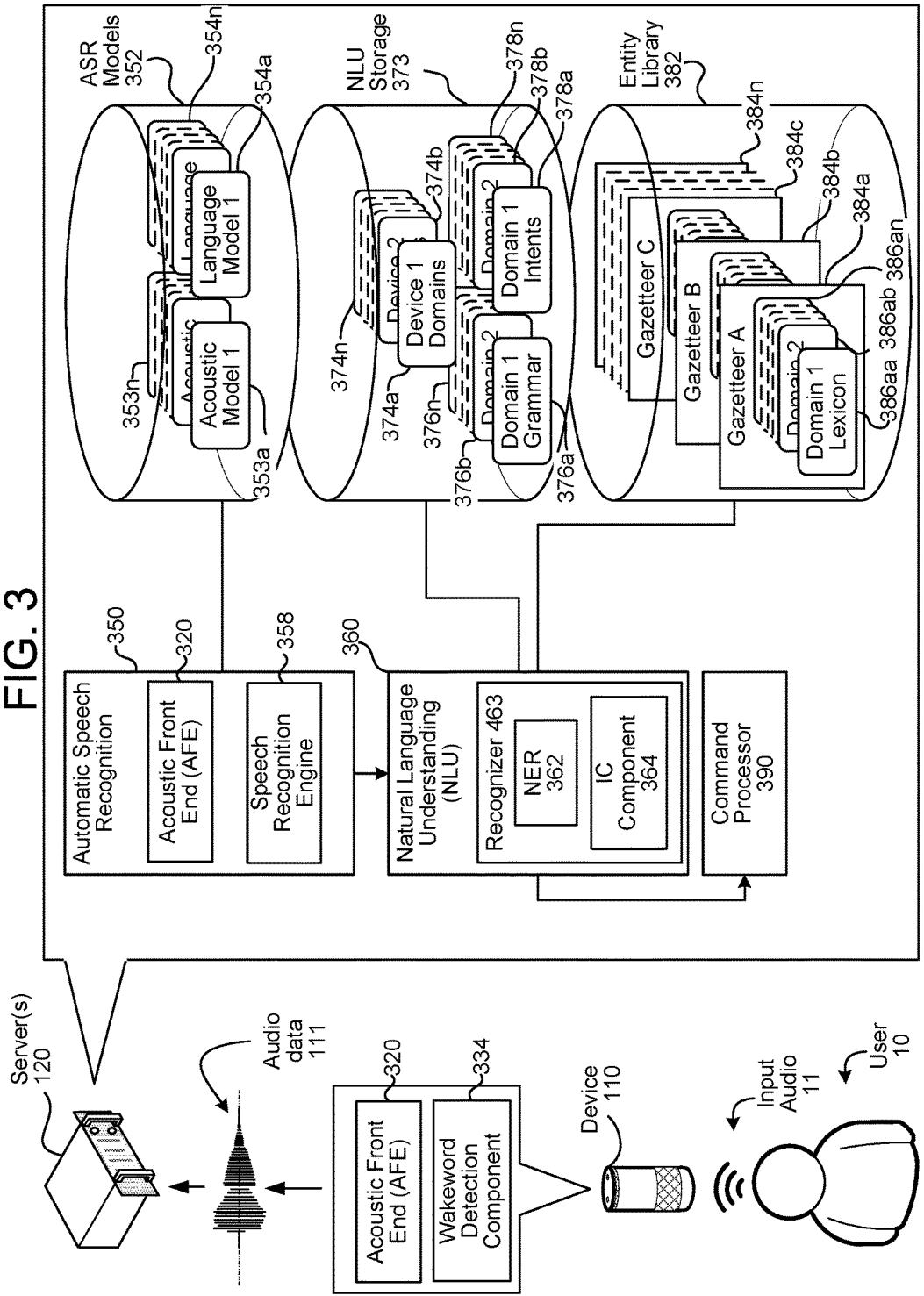

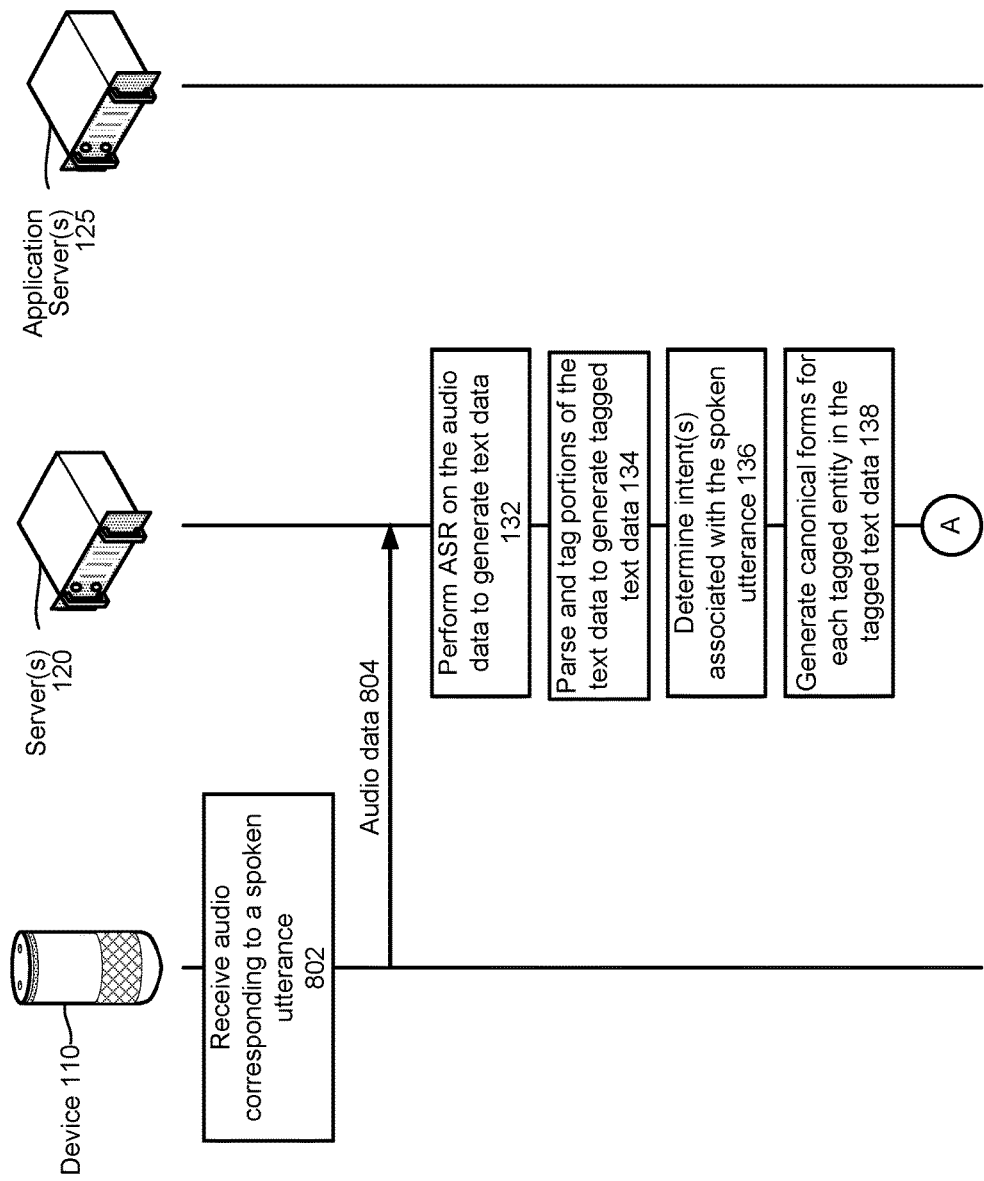

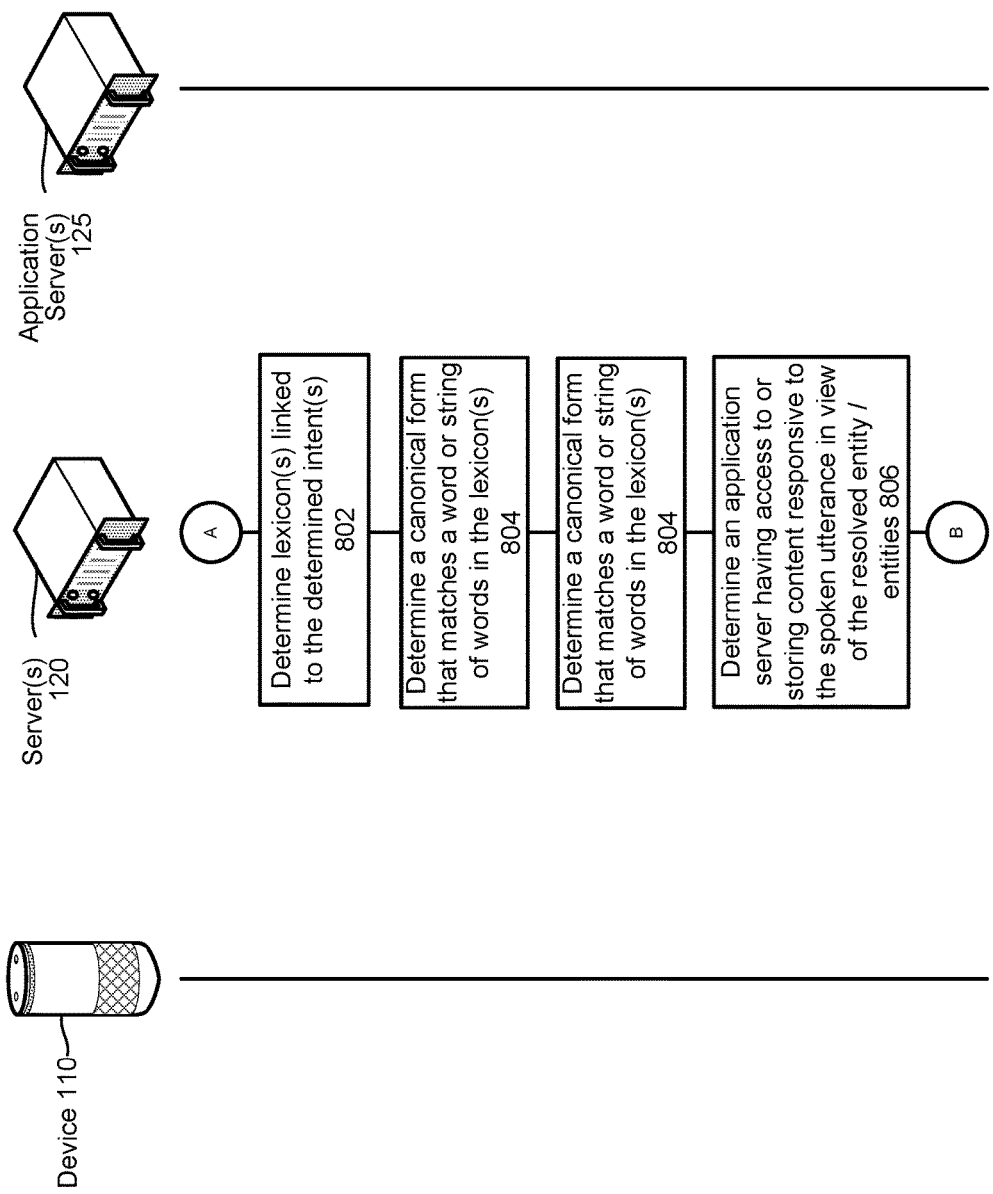

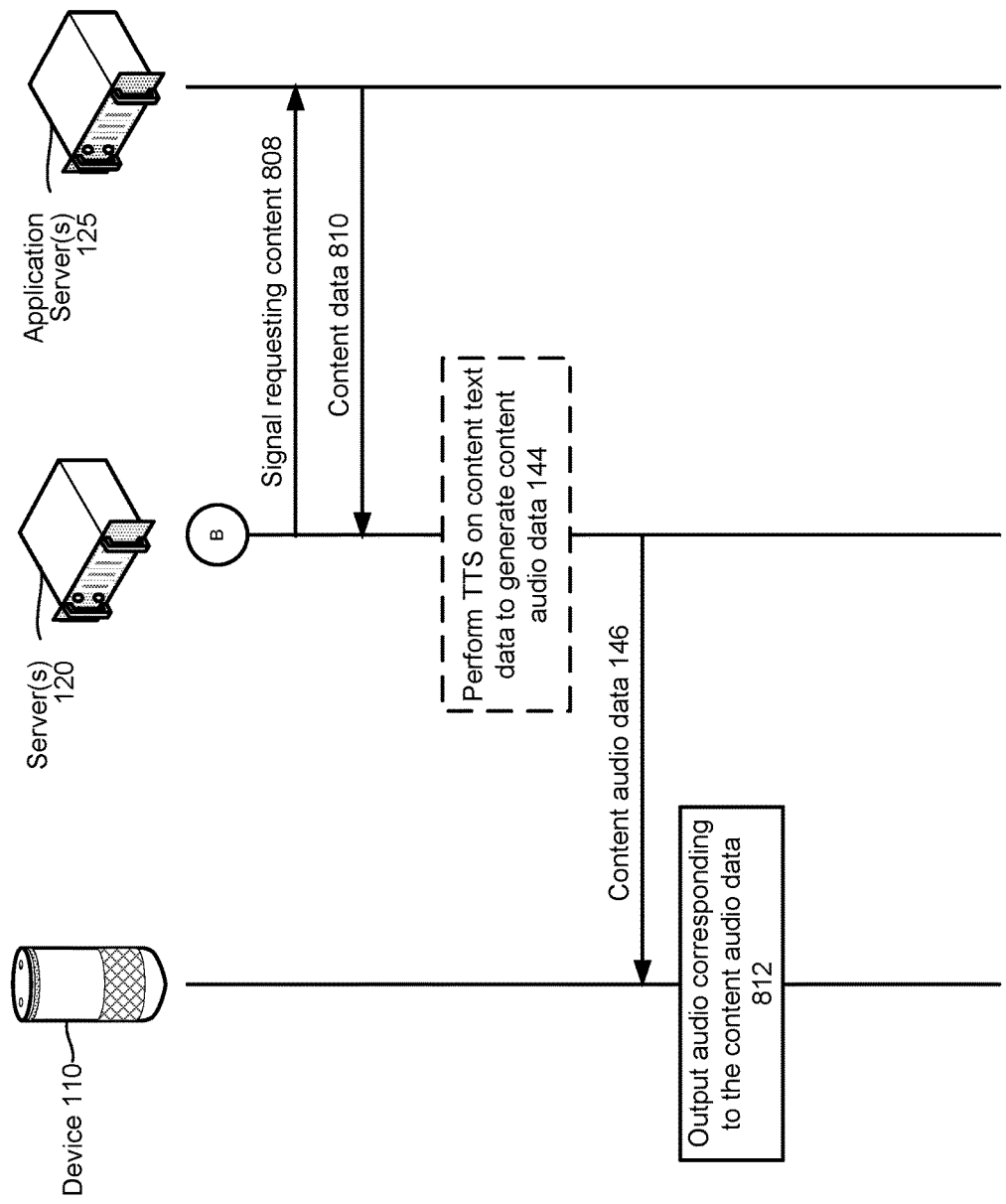

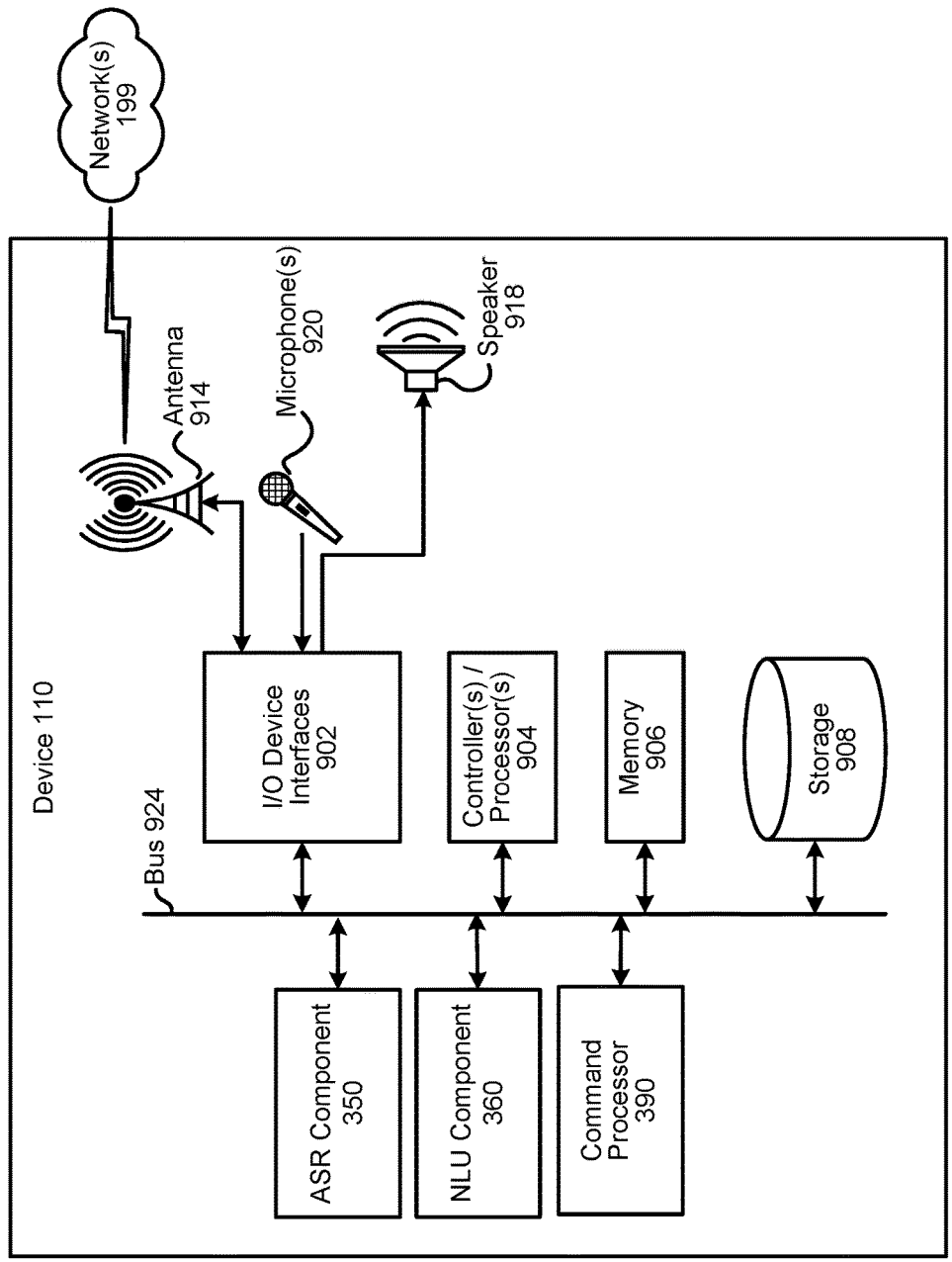

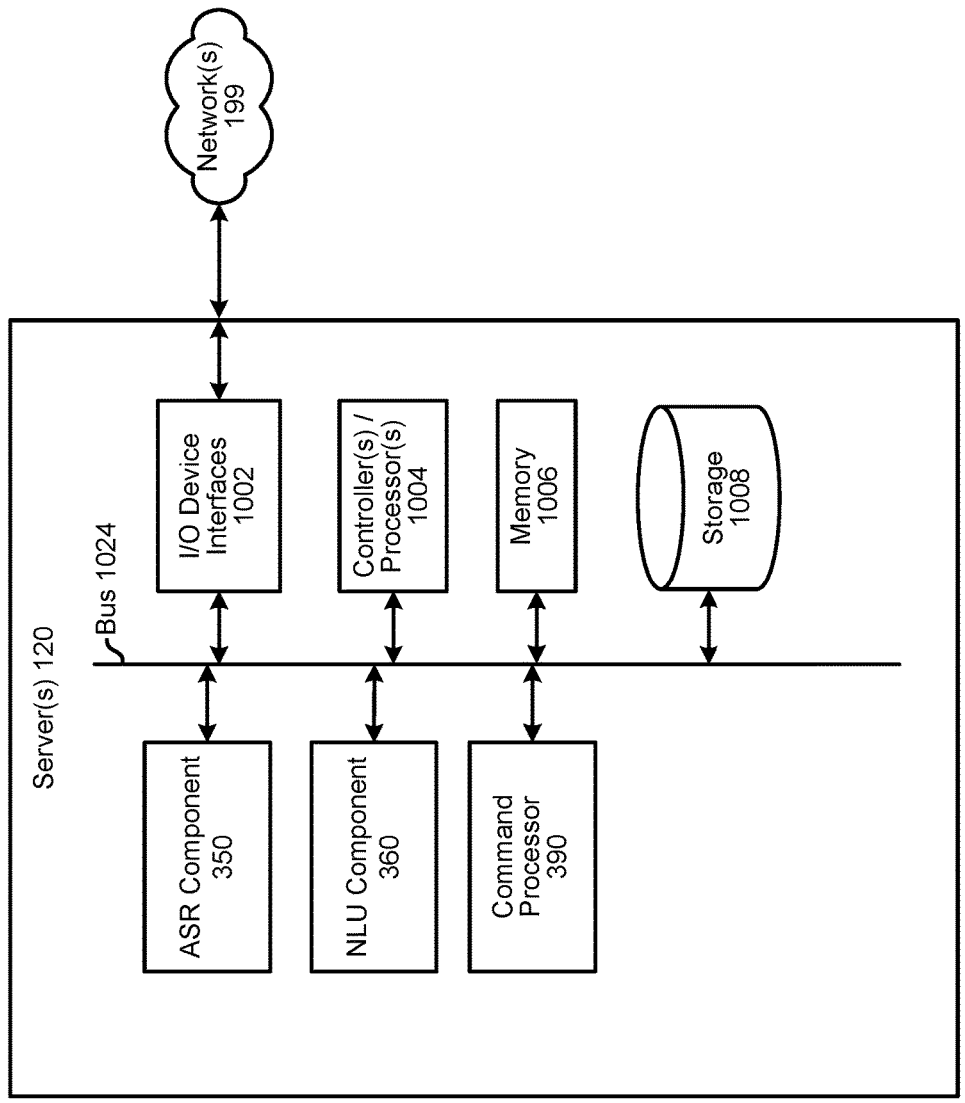

US 10,366,690 B1

SPEECH RECOGNITION ENTITY RESOLUTION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a speech processing system configured to perform speech recognition entity resolution according to embodiments of the present disclosure.

FIG. 2B illustrates key value pairs associated with various application servers according to embodiments of the present disclosure.

FIG. 3 is a diagram of components of a speech processing system according to embodiments of the present disclosure.

FIGS. 8A through 8C are a signal flow diagram illustrating the processing of a spoken command using entity resolution techniques according to embodiments of the present disclosure.

FIG. 9 is a block diagram conceptually illustrating example components of a device according to embodiments of the present disclosure.

FIG. 10 is a block diagram conceptually illustrating example components of a server according to embodiments of the present disclosure.

DETAILED DESCRIPTION

Figure 2A:
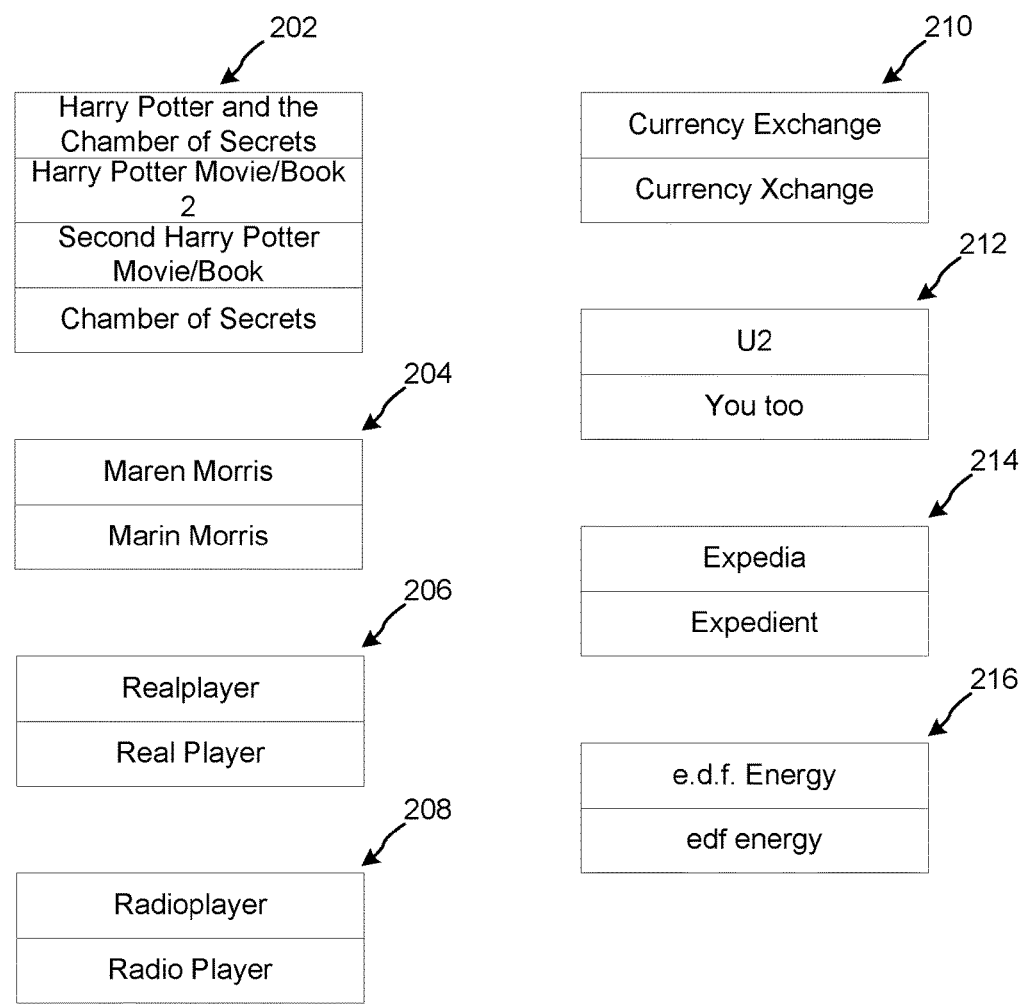
FIG. 2A illustrates examples of canonical forms of various entities according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

A speech processing system may be configured to execute one or more commands corresponding to input speech. For example, a user may say "play song X," and the system may cause a device local to the user to emit audio corresponding to song X. The commands executable by the system may each be associated with preferred forms in which words should be spoken in order for the system to properly recognize the words. For example, an audio book playing application may have a "play audio book" command. The "play audio book" command may be configured to play, for example, Harry Potter books. The system's preferred form for words referring to the second Harry Potter book may be "Harry Potter and the Chamber of Secrets." Problems may arise when users do not speak words that directly correspond to the system's preferred form of the desired entity, in this case the second Harry Potter book. For example, the system may not properly determine a user wants Harry Potter and the Chamber of Secrets to be played if the user says "play Harry Potter book 2," "play second Harry Potter book," "play Chamber of Secrets," etc. If the user refers to a specific entity (e.g., book) without using the preferred format of words expected by the system, the system may output the wrong content (e.g., a different book to which the system attributes the spoken words of the user) or possibly return an error message informing the user that the system did not understand the user. Neither such result is desirable.

The present disclosure fixes the above problems by implementing a canonicalizer. The canonicalizer enables the system to properly identify an entity to which the user refers even when the user does not speak the system preferred words for the particular entity. For example, the system may be configured to recognize a particular entity as a "radio-player." A user may say "please turn on the radio player." The system may map the user speech of "radio player" to "radioplayer" so the system can properly execute the user command. For further example, the system may be configured to recognize a specific business as "Currency Xchange." A user may say please transfer $10 to the currency exchange." The system may map the user speech of "currency exchange" to "Currency Xchange" so the system can properly execute the user command using the proper business. Various other word mapping is also possible. Specific operation of the word mapping and general canonicalization is described below.

FIG. 1 shows a speech processing system 100 capable of performing speech recognition entity resolution as described herein. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 local to user 5, as well as one or more networks 199 and one or more servers 120 connected to the speech-controlled device(s) 110 across the network(s) 199. The server(s) 120 (which may be one or more different physical devices) may be capable of performing traditional speech processing (e.g., ASR, NLU, command processing, etc.) or other operations as described herein. A single server 120 may perform all speech processing or multiple servers 120 may combine to perform all speech processing. Further, the server(s) 120 may execute certain commands, such as answering spoken utterances of users 5 and operating other devices (e.g., light switches, appliances, etc.). In addition, certain speech detection or command execution functions may be performed by the speech-controlled device 110. Further, the system 100 may be in communication with external data sources, such as a knowledge base, external service provider devices (e.g., application servers 125), or the like.

As shown in FIG. 1, a speech-controlled device 110 may capture audio including a spoken utterance (i.e., audio 11) of a user 5 (or other source) via one or more microphones of the speech-controlled device 110. The speech-controlled device 110 determines audio data corresponding to the captured audio 11, and sends the audio data to the server(s) 120 for processing.

The server(s) 120 receives (130) the audio data from the speech-controlled device 110. The server(s) 120 performs (132) ASR on the audio data to generate text data. The server(s) 120 may also perform NLU processing on the text data to generate NLU results. As part of NLU processing, the server(s) 120 may parse and tag (134) portions of the text. For example, for the text "play the second Harry Potter book," the system may parse the text to separate the verb "play" from the subject "second Harry Potter book." The word "play" may be tagged as a command (to output audio corresponding to content) and "the second Harry Potter book" may be tagged as a specific entity and target of the command. As a further part of NLU processing, the server(s) 120 may perform intent classification whereby the server(s) 120 determines (136) an intent of the spoken command (i.e., determines an action to be performed that is responsive to the spoken utterance contained in the audio data).

While a number of intents may be executable by the system, the intent may involve or otherwise reference a particular database of words and phrases for execution. For example, if the intent is a command to play an audio book, the words and phrases in a respective database may correspond to book titles, book authors, etc. of the available catalog of books that can be played. The server(s) 120 may generate (138) canonical forms for each tagged entity in the tagged text data. The canonical form of the entity may depend on the intent of the utterance/the command to be executed. For example, if the command is to play an audio book and the tagged entity text data corresponds to "the second Harry Potter book," the server(s) 120 may create canonical forms such as "Harry Potter and the Chamber of Secrets," "Harry Potter movie 2," or "Chamber of Secrets." The server(s) 120 may then perform entity resolution (which, as explained below, may be a different operation from canonicalization) by determining (140) the canonical form that corresponds to the system preferred format for the given intent. For example, a play audio book intent may prefer the text data state "Harry Potter and the Chamber of Secrets," whereas a play movie intent may prefer the text data state "Harry Potter movie 2." The same audio (or resulting post-ASR text) may be converted into different canonical forms depending on the intent determined by the server(s) 120. For example, "T" may be output if the intent corresponds to transportation (the T is a form of public transportation in Boston, Mass.), "tea" may be output if the intent corresponds to restaurants or beverage establishments, or "tee" may be output if the intent corresponds to sports.

The server(s) 120 may then determine (141) an application server(s) 125 storing or having access to content responsive to the tagged text data in view of the resolved entities.

The server receives (142), from the application server(s) 125, the content corresponding to the resolved entity (i.e., the canonical form corresponding to the system preferred format).

The canonical form of an entity can be sent to first party (1P) applications (such as those controlled or managed by the server(s) 120) as well as third party (3P) applications (such as those managed by application server(s) 125 in communication with the server(s) 120 but not controlled or managed by the server(s) 120). For example, if a 3P application server 125 operates a ride sharing or other map based application, the server(s) 120 may prepare canonical forms of roads, streets, establishments, etc. contained in the text data, and send such canonical forms to the application server 125. By doing such, the server(s) 120 prevents or minimalizes the chance of receiving the wrong content from the application server(s) 125 and/or the chance of receiving an error message due to the data sent to the application server(s) 125 being in an incorrect format for purposes of processing by the application server(s) 125.

As described above, the server(s) 120 receives (130) audio data from the speech-controlled device 110, performs (132) ASR on the audio data to generate text data, and performs further processes with respect to the intent data to determine intent of the spoken utterance, etc. It should thus be appreciated that, rather than receive user input as audio data, the user input may be in the form of text data. For example, a user may type text into an application executed by a computing device such as a smart phone, tablet, or the like. The computing device may generate text data from the input text, and send the text data to the server(s) 120 for processing.

FIG. 2A illustrates example canonicalization forms of various entities as determined using a machine learning component described herein. For example, canonical forms 202 may exist for the second installment of the Harry Potter, canonical forms 204 may exist for Maren Morris, canonical forms 206 may exist for real player, canonical forms 208 may exist for radio player, canonical forms 210 may exists for currency exchanges, canonical forms 212 may exist for you too, canonical forms 214 may exist for expedient, and canonical forms 216 may exist for edf energy. Other canonical forms may also exist. In certain implementations, there may be a single canonical form used across domains of an NLU component (as discussed further below), but there may be various ways in which a user may refer to the entity in speech. For example, "Harry Potter and the Chamber of Secrets" may be the canonical form preferred by the system 100 regardless of whether the user desires the system to output audio book content or video content. However, the user may refer to "Harry Potter and the Chamber of Secrets" in various ways, such as "Chamber of Secrets", "Harry Potter Movie/Book 2," or "Second Harry Potter Movie/Book." If the user refers to "Harry Potter and the Chamber of Secrets" in a form different that the system preferred canonical form, the architecture of the present disclosure (namely the herein disclosed canonicalizer) will output the canonical form for purposes of NLU processing.

FIG. 2B illustrates key value pairs associated with various application servers 125. When a user speaks a certain entity, the server(s) 120 may output ASR text data 218 corresponding thereto that causes an application server(s) 125 to either provide the server(s) 120 with incorrect data or provide the server(s) 120 with an error message. Each application server 125 in communication with the server(s) 120 may have a preferred canonical form 220 that is not typically output by the server(s) 120 and that results in the application server(s)

125 providing the server(s) 120 with proper data. The server(s) 120 may store a table of data (illustrated in FIG. 2B) including server(s) 120 generated ASR text data 218 associated with application server(s) 125 indicated proper canonical form text data 220.

In other implementations, each domain of the NLU architecture may have a respective preferred canonical form for a given entity. For example, an audio book domain may prefer "Harry Potter and the Chamber of Secrets," whereas a movie domain may prefer "Second Harry Potter Movie." In these situations, the canonicalizer disclosed here may output a canonical form specific to each domain triggered by a given user utterance.

Further details of the system 100 are explained below. The system 100 of FIG. 1 may operate using various speech processing components as described in FIG. 3. FIG. 3 is a conceptual diagram of how a spoken utterance is processed. The various components illustrated may be located on a same or different physical devices. Communication between various components illustrated in FIG. 3 may occur directly or across a network(s) 199. An audio capture component, such as a microphone of the device 110 (or other device), captures input audio 11 corresponding to a spoken utterance. The device 110, using a wakeword detection component 334, then processes the audio, or audio data corresponding to the audio (such as feature vectors), to determine if a keyword (such as a wakeword) is detected in the audio. Following detection of a wakeword, the device 110 sends audio data 111 corresponding to the utterance, to a server(s) 120 that includes an ASR component 350. The audio data 111 may be output from an acoustic front end (AFE) 320 located on the device 110 prior to transmission. Alternatively, the audio data 111 may be in a different form for processing by a remote AFE 320, such as the AFE 320 located with the ASR component 350.

Upon receipt by the server(s) 120, an ASR component 350 may convert the audio data 111 into text. The ASR component 350 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 354 stored in an ASR model knowledge base (i.e., ASR model storage 352). For example, the ASR component 350 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 353 stored in the ASR model storage 352), and a likelihood that a particular word that matches the sound would be included in the sentence at the specific location (e.g., using a language model 354 stored in the ASR model storage 352). Thus, each potential textual interpretation of the spoken utterance (i.e., hypothesis) is associated with a confidence score. Based on the considered factors and the assigned confidence score, the ASR component 350 outputs the most likely text recognized in the audio data 111.

The ASR component 350 may also output multiple hypotheses in the form of a lattice or an N-best list with each hypothesis corresponding to a confidence score or other score (e.g., such as probability scores, etc.).

The device or devices including the ASR component 350 may include an AFE 320 and a speech recognition engine 358. The AFE 320 may transform raw audio data, captured by the microphone of the device 110, into audio data for processing by the speech recognition engine 358. The speech recognition engine 358 compares the speech recognition audio data with acoustic models 353, language models 354, and other data models and information for recognizing the speech conveyed in the audio data 111.

The speech recognition engine 358 may process data output from the AFE 320 with reference to information stored in the ASR model storage 352. Alternatively, post front-end processed data (e.g., feature vectors) may be received by the device executing ASR processing from another source besides the internal AFE 320. For example, the device 110 may process audio data 111 into feature vectors (e.g., using an on-device AFE 320) and transmit that information to the server(s) 120 across the network(s) 199 for ASR processing. Feature vectors may arrive at the server(s) 120 encoded, in which case they may be decoded prior to processing by the processor executing the speech recognition engine 358.

The speech recognition engine 358 attempts to match received feature vectors to language phonemes and words as known in the stored acoustic models 353 and language models 354. The speech recognition engine 358 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 350 will output text data that makes sense grammatically.

The speech recognition engine 358 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 358 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server(s) 120, for natural language understanding (NLU) processing, such as conversion of the text data into commands for execution, either by the device 110, by the server(s) 120, or by another device (e.g., a server running a search engine, etc.)

The device performing NLU processing (e.g., the server (s) 120) may include various components, including potentially dedicated processor(s), memory, storage, etc. As shown in FIG. 3, an NLU component 360 may include a recognizer 463 that includes a named entity recognition (NER) component 362 which is used to identify portions of query text that correspond to a named entity that may be recognizable by the system. A downstream process called named entity resolution actually links a text portion to an actual specific entity known to the system. To perform named entity resolution, the system may utilize gazetteer information (384a-384n) stored in an entity library storage 382. The gazetteer information may be used for entity resolution, for example matching ASR results with different entities (such as song titles, contact names, etc.). Gazetteers may be linked to users (for example a particular gazetteer may be associated with a specific user's music collection), may be linked to certain domains (such as shopping), or may be organized in a variety of other ways. The NER component 362 (or other component) may also determine whether a word refers to an entity that is not explicitly mentioned in the utterance text, for example "him," "her," "it" or other anaphora, exophora or the like.

Generally, the NLU process takes text data (such as processed from the ASR component 350 based on the utterance input audio 11) and attempts to make a semantic interpretation of the text. That is, the NLU process determines the meaning behind the text based on the individual words and then implements that meaning. NLU processing interprets a text string to derive an intent or a desired action from the user as well as the pertinent pieces of information in the text that allow a device (e.g., the device 110) to complete that action. For example, if a spoken utterance is processed using the ASR component 350 and outputs the text "call mom," the NLU component 360 may determine that the user intended to activate a telephone in his/her device and to initiate a call with a contact matching the entity "mom" (which may involve a downstream command processor 390 linked with a telephone application).

The NLU component 360 may process several textual inputs related to the same utterance. For example, if the ASR component 350 outputs N text segments (as part of an N-best list), the NLU component 360 may process all N outputs to obtain NLU results.

As will be discussed further below, the NLU component 360 may be configured to parse and tag to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU component 360 may be used to provide answer data in response to queries, for example using a NLU knowledge base 373.

To correctly perform NLU processing of speech input, the NLU component 360 may be configured to determine a "domain" of the utterance so as to determine and narrow down which services offered by the endpoint device (e.g., the server(s) 120 or the device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The NER component 362 receives a query in the form of ASR results and attempts to identify relevant grammars and lexical information that may be used to construe meaning. To do so, the NLU component 360 may begin by identifying potential domains that may relate to the received query. The NLU storage 373 includes a database of device domains (374a-374n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, Speaker ID, Household ID, or some other indicator.

In NLU processing, a domain may represent a discrete set of activities having a common theme, such as "shopping", "music", "calendaring", etc. As such, each domain may be associated with a particular recognizer 463, language model and/or grammar database (376a-376n), a particular set of intents/actions (378a-378n), and a particular personalized lexicon (386). Each gazetteer (384a-384n) may include domain-indexed lexical information associated with a particular user and/or device. For example, the Gazetteer A (384a) includes domain-index lexical information 386aa to 386an. A user's music-domain lexical information (e.g., a gazetteer associated with the user for a music domain) might correspond to album titles, artist names, and song names, for example, whereas a user's contact-list lexical information (e.g., a gazetteer associated with the user for a contact domain) might include the names of contacts. Since every user's music collection and contact list is presumably different, this personalized information improves entity resolution. A lexicon may represent what particular data for a domain is associated with a particular user. The form of the lexicon for a particular domain may be a data structure, such as a gazetteer. A gazetteer may be represented as a vector with many bit values, where each bit indicates whether a data point associate with the bit is associated with a particular user. For example, a music gazetteer may include one or more long vectors, each representing a particular group of musical items (such as albums, songs, artists, etc.) where the vector includes positive bit values for musical items that belong in the user's approved music list. Thus, for a song gazetteer, each bit may be associated with a particular song, and for a particular user's song gazetteer the bit value may be 1 if the song is in the particular user's music list. Other data structure forms for gazetteers or other lexicons are also possible.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and processed using the grammar models and lexical information for music. The responses based on the query produced by each set of models is scored (discussed further below), with the overall highest ranked result from all applied domains being ordinarily selected to be the correct result.

An intent classification (IC) component 364 parses the query to determine an intent or intents for each identified domain, where the intent corresponds to the action to be performed that is responsive to the query. Each domain is associated with a database (378a-378n) of words linked to intents. For example, a music intent database may link words and phrases such as "quiet," "volume off," and "mute" to a "mute" intent. The IC component 364 identifies potential intents for each identified domain by comparing words in the query to the words and phrases in the intents database 378. Traditionally, the determination of an intent by the IC component 364 is performed using a set of rules or templates that are processed against the incoming text to identify a matching intent.

In order to generate a particular interpreted response, the NER component 362 applies the grammar models and lexical information associated with the respective domain to recognize a mention of one or more entities in the text of the query. In this manner the NER component 362 identifies "slots" (i.e., particular words in query text) that may be needed for later command processing. Depending on the complexity of the NER component 362, it may also label each slot with a type of varying levels of specificity (such as noun, place, city, artist name, song name, or the like). Each grammar model 376 includes the names of entities (i.e., nouns) commonly found in speech about the particular domain (i.e., generic terms), whereas the lexical information 386 from the gazetteer 384 is personalized to the user(s) and/or the device. For instance, a grammar model associated with the shopping domain may include a database of words commonly used when people discuss shopping.

The intents identified by the IC component 364 are linked to domain-specific grammar frameworks (included in 376) with "slots" or "fields" to be filled. Each slot/field corresponds to a portion of the query text that the system believes corresponds to an entity. For example, if "play music" is an identified intent, a grammar framework(s) 376 may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER component 362 may parse the query to identify words as subject, object, verb, preposition, etc., based on grammar rules and/or models, prior to recognizing named entities. The identified verb may be used by the IC component 364 to identify intent, which is then used by the NER component 362 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 362 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or the NER component 362 may be constructed using techniques such as HMMs, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 364 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 362 may search the database of generic words associated with the domain (in the knowledge base 373). So for instance, if the query was "play songs by the rolling stones," after failing to determine an album name or song name called "songs" by "the rolling stones," the NER component 362 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output data from the NLU processing (which may include tagged text data, commands, etc.) may then be sent to a command processor 390, which may be located on a same or separate server 120 as part of system 100. The system 100 may include more than one command processor 390, and the destination command processor 390 may be determined based on the NLU output. For example, if the NLU output includes a command to play music, the destination command processor 390 may be a music playing application, such as one located on the device 110 or in a music playing appliance, configured to execute a music playing command. If the NLU output includes a search utterance (e.g., requesting the return of search results), the command processor 390 selected may include a search engine processor, such as one located on a search server, configured to execute a search command and determine search results, which may include output text data to be processed by a text-to-speech engine and output from a device as synthesized speech.

If the NLU output includes a command to obtain content from another source, the command processor 390 or other component, through an application program interface (API), may send a request for such content to an appropriate application server or other device. The application server may send the content, for example audio content, to the command processor 390 or other component. In certain instances, the output content sent from the application server may include a link that may be sent from the server(s) 120 to the device 110 closest to the user (e.g., first device 110a) so that the first device 110a may use the link to access the output content desired by the user. In this case the output content data may be sent from the application server through the server(s) 120 to the first device 110a or directly from the application server to the first device 110a (or some other destination appropriate to the command). In certain instances the output content data may be audio data (such as music, a prerecorded reading of an audio book, etc.) and thus may be output through a speaker of the device 110. In other instances the output content data may be text data (either generated by the application server or by a component of the server(s) 120) that needs to be converted into audio data prior to being output to a user by the device 110.

Various machine learning techniques may be used to train and operate models to perform various steps described above, such as frame scoring, frame detection, presence indication generation, ASR functions, NLU functions, etc. Such machine learning techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 4:
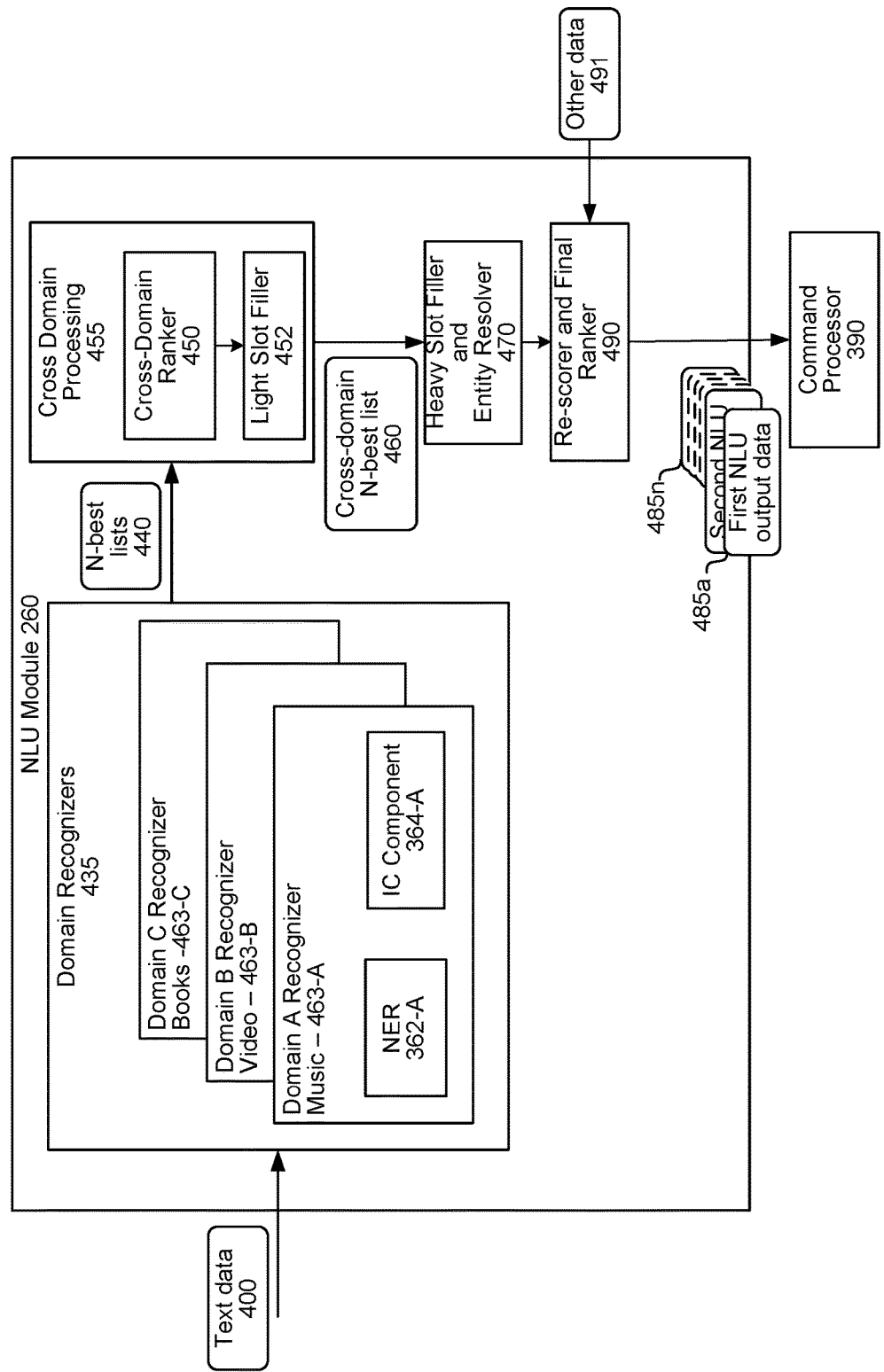
FIG. 4 is a conceptual diagram of a system architecture for parsing incoming utterances using multiple domains according to embodiments of the present disclosure.

The NLU operations of existing systems may take the form of a multi-domain architecture, such as that illustrated in FIG. 4. In the illustrated architecture, each domain (which may include a set of intents and entity slots that define a larger concept such as music, books etc. as well as components such as trained models, etc. used to perform various NLU operations such as NER, IC, or the like) may be constructed separately and made available to an NLU component 360 during runtime operations where NLU operations are performed on text (such as text output from an ASR component 350). Each domain may have specially configured components to perform various steps of the NLU operations.

For example, in a typical NLU system, the system may include a multi-domain architecture consisting of multiple domains for intents/commands executable by the system (or by other devices connected to the system), such as music, video, books, and information. The system may include a plurality of domain recognizers 435, where each domain may include its own recognizer 463. Each recognizer 463 may include various NLU components such as an NER component 362, IC component 364 and other components such as an entity resolver, or other components.

For example, a music domain recognizer 463-A (Domain A) may have an NER component 362-A that identifies what slots (i.e., portions of input text) may correspond to particular words relevant to that domain. The words may correspond to entities such as (for the music domain) a performer, album name, song name, etc. An NER component 362 may use a machine learning model, such as a domain specific conditional random field (CRF) to both identify the portions corresponding to an entity as well as identify what type of entity corresponds to the text portion. For example, for the text "play songs by the stones," an NER 362-A trained for a music domain may recognize the portion of text [the stones] corresponds to an entity and an artist name. The music domain recognizer 463-A may also have its own IC component 364-A that determines the intent of the text assuming that the text is within the proscribed domain. An IC component 364 may use a model, such as a domain specific maximum entropy classifier to identify the intent of the text, where the intent is the action the user desires the system to perform.

As illustrated in FIG. 4, multiple domains may operate substantially in parallel, with different domain specific components. That is, domain B for video may have its own recognizer 463-B including an NER component 362-B and IC component 364-B. Domain C for books may also have similar components in its recognizer 463-C, and so on for the different domains available to the system. When input text data 400 (e.g., ASR output text data, text data received from a companion application, etc.) is received, the same text that is input into the NLU pipeline for domain A 463-A may also be input into the NLU pipeline for domain B 463-B, where the components for domain B 463-B will operate on the text as if the text related to domain B, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 4, an NER component 362 and IC component 364 may be considered part of a recognizer (such as recognizer 463-A, 463-B, etc.). The recognizers may operate using machine learning trained models such as a CRF, maximum entropy classifier, neural network (such as a deep neural network (DNN) or recurrent neural network (RNN)), or other classifier. The recognizers 435 may also use rules that operate on input query text in a particular form to identify named entities and/or intents. The recognizers 435 may also operate using a data structure such as a finite state transducer (FST) to process the query text to perform NER and/or IC. Other techniques or models may also be used to perform NER and/or IC. The techniques may also be used together. For example, a set of rules, an FST, and a trained machine learning model may all operate on input text substantially in parallel to determine the named entities/intents of an input utterance. If one technique performs its task with high enough confidence, the system may use the output of that technique over the others. The system may also prioritize the results of different techniques in certain circumstances (for example rules results may be higher priority than FST results, which may be higher priority than model results, or some other configuration). Each recognizer (such as 463-A, 463-B, 463-C) may have its own rules, FSTs, and/or models operating such that each recognizer operates substantially in parallel to the other recognizers to come up with its own interpretation of the input text.

The output of each recognizer is a N-best list of intents and identified slots representing the particular recognizer's top choices as to the meaning of the input query text, along with scores for each item in the N-best list. For example, for input text 400 of "play poker face by lady gaga," the music domain recognizer 463-A may output an N-best list in the form of:

[0.95] PlayMusicIntent ArtistName: Lady Gaga SongName: Poker Face

[0.02] PlayMusicIntent ArtistName: Lady Gaga

[0.01] PlayMusicIntent ArtistName: Lady Gaga AlbumName: Poker Face

[0.01] PlayMusicIntent SongName: Pokerface where NER component 362-A of recognizer 463-A has determined that, for different items in the N-best list, the words "poker face" correspond to a slot and the words "lady gaga" correspond to a slot. Different items in the N-best list interpret those slots differently, for example labeling "poker face" as a song name in one choice but labeling it as an album name in another. The IC component 364-A of recognizer 463-A has also determined that the intent of the input query is a PlayMusicIntent (and selected that as the intent for each item on the music N-best list). The recognizer 463-A also determined a score for each item on the list representing the recognizer's confidence that the particular item is correct. As can be seen in the example, the top item has the highest score. Each recognizer of the recognizers 435 may operate on the input query text substantially in parallel, resulting in a number of different N-best lists, one for each domain (e.g., one N-best list for music, one N-best list for video, etc.). The size of any particular N-best list output from a particular recognizer is configurable and may be different across domains.

While the recognizers 435 perform NER, that is they may identify words of the input query text that are important for downstream processing (sometimes called light slot filling), and may even label those words according to type (such as artist name, album name, city, or the like), the recognizers 435 may not perform entity resolution (i.e., determining the actual entity corresponding to the words of the input query text). Entity resolution is typically a higher latency process and involves communications with a knowledge base or other component to precisely identify the specific entities. As this process is resource intensive, it may be preferable to not perform this task for each item of every N-best list across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 440 may be passed to a cross domain processing component 455 which may then further rank the individual items on the N-best list as well as perform other operations.

The cross domain processing component 455 may include a cross-domain ranker 450. The cross-domain ranker 450 takes the group of N-best lists 440 and selects from among the lists the top choices to create a new N-best list that may include items from different domains, but only includes the highest scoring ones of those domains. The purpose of the cross-domain ranker 450 is to create a new list of top scoring potential results, so that downstream (more resource intensive) processes may only operate on the top choices.

As an example of a multi-domain N-best list created by the cross-domain ranker 450, take the example input query text 400 of "play the hunger games." The text may be processed by each of the recognizers 435, and each will output an N-best list, resulting in a group of N-best lists 440 input into the cross domain processing component 455. The cross-domain ranker 450 may then rank the individual items among the N-best lists to create a new N-best list. For example, the cross-domain ranker 450 may output an N-best list in the form of:

[0.78] Video PlayVideoIntent VideoName: The Hunger Games

[0.13] Books ReadBookIntent BookName: The Hunger Games

[0.07] Music PlayMusicIntent AlbumName: Hunger Games where the top items from different N-best lists from multiple domains are grouped into a single cross-domain N-best list 460. As shown, the top scoring item is from the video domain 463-B, and includes the intent "playvideointent" and a slot labeled as video name corresponding to the text "the hunger games." The next item is from the books domain 463-C, and includes the intent "readbookintent" and a slot labeled as book name corresponding to the text "the hunger games." Each item in the cross-domain N-best list 460 may also include a score. The size of the cross-domain N-best list 460 is configurable.

While the cross-domain ranker 450 takes as input the group of N-best lists 340, it may also consider other information, such as other data 491.

The cross domain processing component 455 may also include a light slot filler component 452. The light slot filler component 452 can take information from slots and alter it to make the data more easily processed by downstream components. The operations of the light slot filler component 452 are typically low latency operations that do not involve heavy operations such as reference to a knowledge base. The purpose of the light slot filler component 452 is to replace words with other words or values that may be more easily understood by downstream components. For example, if an input query text included the word "tomorrow" the light slot filler component 452 may replace the word "tomorrow" with an actual date for purposes of downstream processing. Similarly, a word "CD" may be replaced by a word "album." The light slot filler component 452 may perform other text normalization processes as well. The replaced words are then included in the cross-domain N-best list 460.

The cross-domain N-best list 460 is then output to a heavy slot filler and entity resolution component 470. This component 470 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The resolver 470 can refer to an authority source (such as a knowledge base) that is used to specifically identify the precise entity referred to in the incoming text. Specific intent/slot combinations may also be tied to a particular source, which may then be used to resolve the text (such as by providing information or a command to be executed in response to a user query). For example, in the example "play songs by the stones," the resolver 470 may reference to a personal music catalog, Amazon Music account, user profile 704, or the like. The output from the entity resolution component 470 may include an altered N-best list that is based on the cross-domain N-best list 460 but also includes more detailed information about the specific entities mentioned in the text (such as specific entity IDs) and/or more detailed slot data that can eventually be used by a command processor 390 which may be incorporated into the same system components or pipeline or may be on a separate device in communication with the system. While illustrated as a cross-domain resolver, multiple resolution components 470 may exist where a particular resolution component 470 may be specific to one or more domains.

As can be appreciated, the entity resolver 470 may not necessarily be successful in resolving every entity and filling every slot. This may result in incomplete results in the combined N-best list. A re-scorer and final ranker 490 may consider such errors when determining how to rank the ultimate results for potential execution. For example, if one of the N-best lists comes from a book domain and includes a read book intent, but the entity resolver 470 cannot find a book with a title matching the input query text, that particular result may be re-scored by the final ranker 490 to be given a lower score. Each item considered by the final ranker 490 may also be assigned a particular confidence, where the confidence may be determined by a recognizer 435, cross domain processor 455, or by the final ranker 490 itself. Those confidence scores may be used to determine how to rank the individual NLU results represented in the N-best lists. The confidence scores may be affected by unfilled slots. For example, if one domain is capable of filling a slot (i.e., resolving the word in the slot to an entity or other recognizable form) for an input query the results from that domain may have a higher confidence than those from a different domain that is not capable of filling a slot.

The final ranker 490 may be configured to apply re-scoring, biasing, or other techniques to obtain the most preferred ultimate result. To do so, the final ranker 490 may consider not only the NLU results of the N-best lists, but may also consider other data 491. This other data 491 may include a variety of information. For example, the other data 491 may also include application rating or popularity. For example, if one application has a particularly high rating, the system may increase the score of results associated with that particular application. The other data 491 may also include information about applications that have been specifically enabled by the user (as indicated in a user profile 704). NLU results from enabled applications may be scored higher than results from non-enabled applications. User history may also be considered, such as if the user regularly uses a particular supplemental application or does so at particular times of day. Date, time, location, weather, type of device, customer ID, context, and other information may also be considered. For example, the system may consider when any particular applications are currently active (such as music being played, a game being played, etc.) between the system and device 110. The highest scoring result (or results in the case of multiple commands being in an utterance) may be passed to a downstream command processor 390 for execution.

Following final ranking, the NLU component 360 may output NLU output data 485. The NLU output data 485 may include an indicator of the command to be executed along with data associated with the command, for example an indication that the command is "play music" and the music to be played is "Adele." The NLU output data 485 may be in the form of previous NLU data such as item(s) N-best list 440, item(s) in cross-domain N-best list 460, or the like. The NLU output data 485 may also be in a format executable by the command processor 390. Multiple instances of NLU output data (e.g., 485a-485n) may also be output.

If the NLU output includes a command to obtain content from another source, the command processor 390 or other component, through an application program interface (API), may send a request for such content to an appropriate application server 125. The application server(s) 125 may send the content, for example audio content, to the command processor 390 or other component. In certain instances, the output content sent from the application server(s) 125 may include a link that may be sent from the server(s) 120 to the local device 110 so that the local device 110 may use the link to access the output content desired by the user. In this case, the output content data may be sent from the application server(s) 125 through the server(s) 120 to the local device 110 or directly from the application server(s) 125 to the local device 110. In certain instances the output content data may be audio data (such as music, a prerecorded reading of an audio book, etc.) and thus may be output through a speaker of (or in communication with) the local device 110. In other instances, the output content data may be text data (either generated by the application server(s) 125 or by a component of the server(s) 120) that needs to be converted into audio data prior to being output to a user using the local device 110. To convert text data into output audio data including speech, the system may use a text-to-speech (TTS) component.

Figure 5:
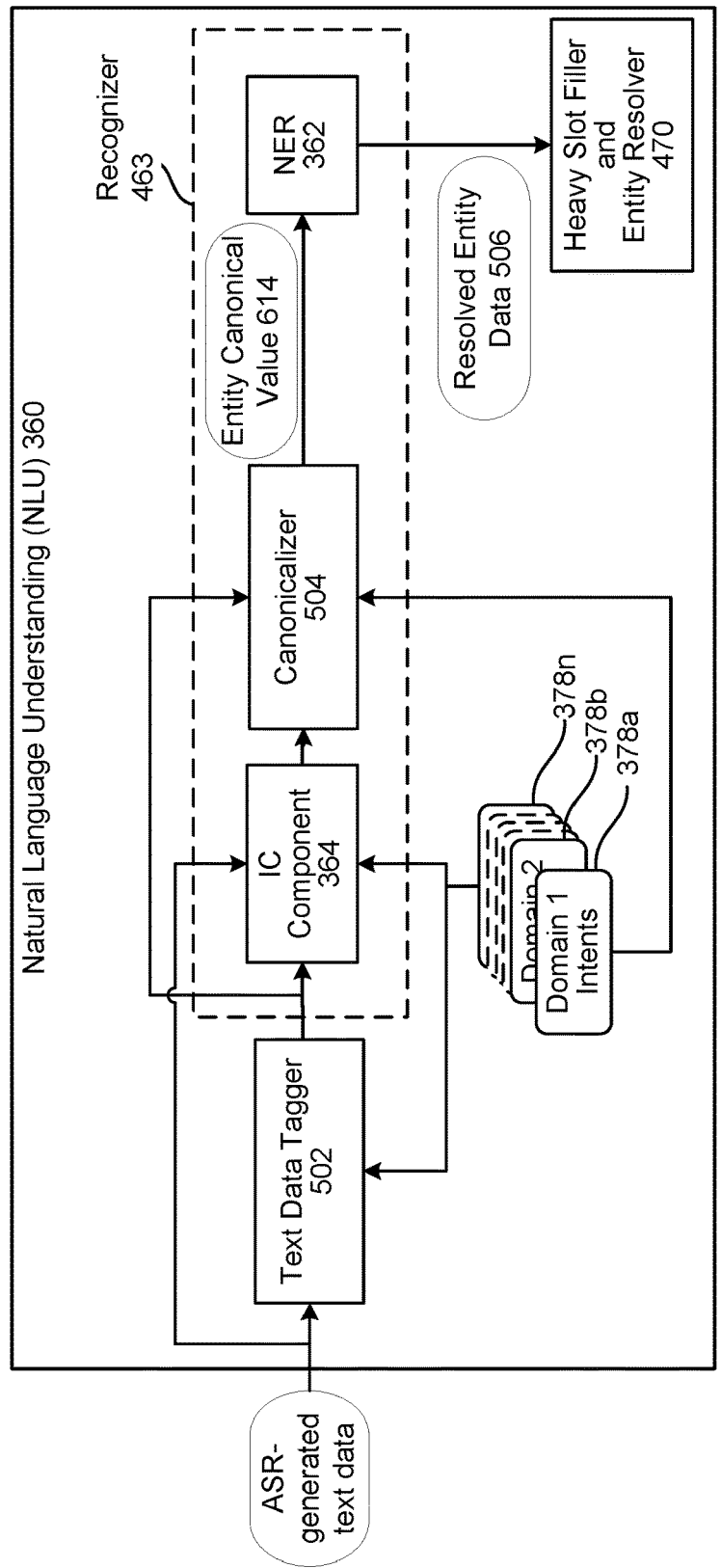
FIG. 5 is a diagram of components of a speech processing system configured to perform speech recognition entity resolution according to embodiments of the present disclosure.

FIG. 5 further illustrates components of the NLU component 360. The NLU component 360 may include a text data tagger 502. The text data tagger 502 processes text data (e.g., generated by the ASR component 350, text data typed by a user, etc.) to determine what portions may indicate a command, what portions may correspond to a subject of the command, etc. For example, for the text "play the second Harry Potter book," "play" may be tagged as a command (to output audio corresponding to content) and "the second Harry Potter book" may be tagged as a specific entity and target of the command.

The NLU component 360 may also include the intent classifier (IC) component 364. The IC component 364 parses the text data corresponding to the spoken utterance to determine an intent(s) associated with one or more NLU domains, where the intent corresponds to the action to be performed that is called for by the spoken utterance.

Each domain is associated with a database of words or lexicon (378a-378n) linked to intents. For example, a music intent database may link words and phrases such as "quiet," "volume off," and "mute" to a "mute" intent.

The NLU component 360 may further include a canonicalizer 504. As illustrated, the canonicalizer 504 may be implemented within the recognizer 463. It should also be appreciated that the canonicalizer 504 may be implemented within the NLU component 360, but outside or separate from the recognizer 463. Each recognizer 463 may include its own respective canonicalizer 504. Alternatively, a single canonicalizer 504 may operate across domains of the NLU component 360. The canonicalizer 504 formats text data output by ASR that is not usable by the NLU component 360 into formats usable by the NLU component 360 to generate proper results. For example, the canonicalizer 504 is beneficial when words in the text data have multiple spellings, various spacings, etc. The canonicalizer 504 generates canonicalized text data for entities represented in the tagged text data output from the text data tagger 502. Canonicalization may include casing normalization, punctuation addition/removal, addition/removal of white spaces, word and phonetic level substring matching, number-to-text mapping (and vice versa), acronym generation (e.g., International Business Machines→IBM), etc. For example, if the tagged entity text data corresponds to "the second Harry Potter book," the canonicalizer 504 may generate canonical forms such as "Harry Potter and the Chamber of Secrets," "Harry Potter movie 2," or "Chamber of Secrets." As a further example, if the tagged entity text data corresponds to "edf energy," the canonicalizer 504 may generate a canonical form such as "e.d.f. energy." As an additional example, if the tagged entity text data corresponds to "American Express,"

the canonicalizer 504 may generate a canonical form such as "Amex." It should be appreciated that the canonicalizer 504 may generate as many canonical forms as possible for each entity.

The canonicalizer 504 may canonicalize different entities (each represented as a string of text or words in the text data output by the ASR component 350) based on the different intents output by the IC component 364. That is, the canonicalizer 504 may map a word or words in the text data to a proper form for a given intent.

The canonicalizer 504 may include or be in communication with a single table of text data include single words or groups of words represented in various canonicalized forms. The canonicalized forms of a given word or group of words may be grouped and associated with a respective intent (e.g., an intent for which the canonicalized forms are proper for purposes of NLU processing). When the canonicalizer 504 receives entity text data and intent data representing a single intent, the canonicalizer 504 may simply access portions of the table associated with the single intent for purposes of canonicalizing the entity text data. This allows the canonicalizer 504 to canonicalize an entity without performing superfluous operations (e.g., attempting to canonicalize entity text data with respect to an intent that is not represented in the intent text data received by the canonicalizer 504).

Alternatively, the canonicalizer 504 may include or be in communication with multiple tables. Each table may include groupings of canonical forms of a word or group or words for a given intent. That is, the canonicalizer 504 may include or be in communication with a first table including canonical forms for the music domain 463-A, a second table including canonical forms for the video domain 463-B, a third table including canonical forms for the books domain 463-C, etc.

The server(s) 120 may maintain the table or tables including the canonical text data. Alternatively, individual application servers 125 may maintain the table or tables. For example, a first application server may maintain portions of the table or tables including canonical forms of entities executable by the first application server, a second application server may maintain portions of the table or tables including canonical forms of entities executable by the second application server, etc.

If intent data representing a single intent is input into the canonicalizer 504, the canonicalizer 504 may simply canonicalize text data in view of the single intent. If, instead, intent data representing more than one intent is input into the canonicalizer 504, the canonicalizer 504 may canonicalize text data in view of each intent, and therefrom create an N-best list of canonicalized hypotheses.

The canonicalizer 504 does not need to know the intent with respect to which the canonicalizer 504 should canonicalize a given set of text data. Each intent may be associated with a respective gazetteer 384 containing text data associated with the intent. Thus, instead of feeding the canonicalizer 504 intent data representing an intent, the canonicalizer 504 may simply be instructed to canonicalize a given set of text data with respect to a specific gazetteer 384. To canonicalize text data using a gazetteer 384, the canonicalizer 504 may identify a string of text data in the gazetteer 384 that is most similar to the text data being canonicalized. It is beneficial to ensure that the text data to be canonicalized and the text data in the gazetteer 384 are in the same language.

The text data received by the canonicalizer 504 may include a canonicalization field associated with each entity determined within the utterance represented in the text data. The canonicalizer 504 may output the text data with canonicalization fields populated with applicable entity canonical values. A populated canonicalization field may include a single canonical value (i.e., a single canonical form) or multiple canonical values. If the canonicalizer 504 knows the intent of the utterance (i.e., if the canonicalizer 504 receives intent data representing a single intent from the IC component 364), the canonical value(s) of a given populated canonicalization field may be specific to the intent.

The named entity recognition (NER) component 362 may resolve the entity using output of the canonicalizer 504 and the database(s) of words or lexicon (378a-378n) linked to intents. The NER component 362 may determine a database(s) or words or lexicon (378a-378n) associated with the intent output by the IC component 364. The NER component 362 determines a canonical form output by the canonicalizer 504 that matches a word or string of words indicated in the lexicon (378a-378n) associated with the intent. If the IC component 364 outputs more than one intent applicable to the spoken utterance, the NER component 362 may compare the canonical forms output by the canonicalizer 504 to each lexicon 378 associated with each output intent. Thus, the canonicalizer 504 may operate in parallel such that the canonicalizer 504 may create canonical forms of entities for each output intent. If the NER component 362 only matches one canonical form to a word or string of words in a single lexicon, the NER component 362 outputs a single resolved entity. If the NER component 362 matches one or more canonical forms to a word(s) or string(s) of words in multiple lexicons, the NER component 362 may output a resolved entity 506 for each intent whose associated lexicon matches a canonical form along with a respective score corresponding to how closely the canonical form corresponds to the text for the intent. The resolved entity data 506 may be incorporated into the N-best lists 440 output by the recognizers 435. The N-best lists, entities, canonical forms, etc. generated in order to interpret the spoken utterance may be ranked by a final entity ranker, such as ranker 490. This allows the system 100 to properly identify entities for command processing purposes even if the user does not speak the entity in the form needed by the system to perform such command processing.

While FIG. 5 illustrates the canonicalizer 504 being prior to the NER 362 in an NLU processing stream, it should be appreciated that the canonicalizer 504 may be located elsewhere in the NLU processing stream. For example, the canonicalizer 504 may be located between the NER 362 and the entity resolver 470. In this instance, the NER 362 may output text data representing an entity (but not any particular entity). The canonicalizer 5040 may process the text data to generate a canonical value for each possible skill invoked by the utterance. For example, if the user states "play the Harry Potter 2," the NER 362 may determine "Harry Potter 2" is an entity, with resolving the entity's identity. The canonicalizer 504 may then generate a canonical value corresponding to "Harry Potter 2" for each skill (e.g., a movie playing skill, an audio book playing skill, etc.) invoked by the utterance. The entity resolver 470 may then resolve the entity "Harry Potter 2" to a specific skill, and choose the canonical value output by the canonicalizer 504 and associated with the skill.

In another example, the canonicalizer 504 may be located after the entity resolver 470 in the NLU processing stream. In this instance, the NER 362 may output text data that indicates a given portion of text corresponds to an entity (but not any particular entity). Such data may be input to the entity resolver 470, which determines an exact entity to which the text data corresponds. The text data and corresponding entity data may be input to the canonicalizer 504, which determines a single canonical value for the text data associated with the resolved entity. That is, since the entity resolver 470 resolves entities with respect to given skills, the canonicalizer 504 may determine a single canonical value for the text data for the resolved skill.

Figure 6:
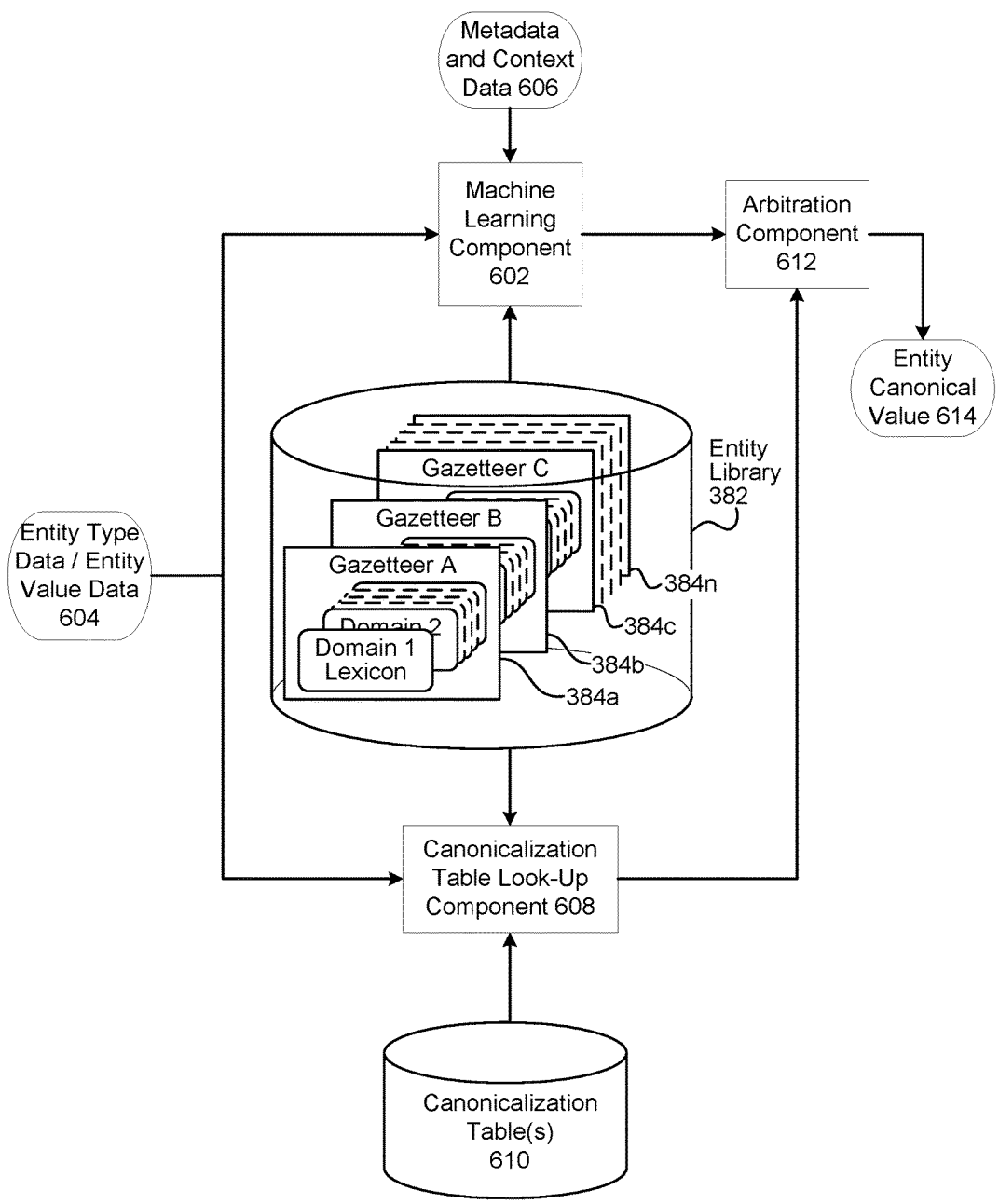
FIG. 6 is a diagram of components of a canonicalizer according to embodiments of the present disclosure.

FIG. 6 illustrates components and operation of the canonicalizer 504. The canonicalizer 504 may include a machine learning component 602. Entity type data (e.g., song title, artist, album, etc.) and corresponding entity value data (e.g., Water Under the Bridge, Adele, 25, etc.) 604 may be passed to the machine learning component 602. The entity value data may be a string of text or words. The machine learning component 602 may generate one or more canonical forms (such as one or more text string or word string) for each received entity value. For example, the machine learning component 602 may generate a text or word string that corresponds to the entity type data or a user intent of the spoken utterance. The generated text or word string may include all or a portion of the text or word string represented in the entity value data. The machine learning component 602 may generate the one or more canonical forms for each entity value using one or more of features generated from semantic tagging, feature generated from processing of the entity value, and a gazetteer 384 tied to the entity type and/or intent. Features generated from processing of the entity value include punctuation removal, punctuation addition, stemming, casing corrections, white space adjustments, numerical mappings, and the like. In some instances, the machine learning component 602 may not modify an entity value input into the machine learning model 602, for example when the input entity value does not contain any punctuation or the input entity value is not a multi-word entity value.

The machine learning component 602 may compare text strings represented in the entity value data to an underlying gazetteer(s) of the intent associated with the user command. The machine learning component 602 may perform text character level matching, word level matching, and/or semantic processing to determine a canonical form for each entity value represented in the entity value data provided as input into the machine learning component 602. For example, if the intent corresponding to the user command is a play music intent, the machine learning component 602 may determine a gazetteer(s) associated with the play music intent. Moreover, if the entity type data corresponds to songs, the machine learning component 602 may identify entity values in the play music intent gazetteer(s) corresponding to the entity type of songs, and may therefrom determine a canonical form for the entity value represented in the entity value data provided as input into the machine learning component 602.

Metadata 606 may also be input into the machine learning component 602. For example, the metadata 606 may include user specific system usage data such as what types of movies has the user watched in the past, or how long ago has it been since the user watched a particular movie. For example, if the user intent corresponds to play a movie and the metadata 606 indicates the user has watched action movies in the past but not thriller, the machine learning component 602 may attempt to determine the canonical form with respect to action movies and not thriller movies. The metadata 606 may include other user specific data not explicitly mentioned herein.

The canonicalizer 504 may also include a canonicalization table look-up component 608. The entity type data and entity value data 604 input into the machine learning component 602 may also be input into the canonicalization table look-up component 608. The entity type data may represent song title, artist, album, etc. The entity value data may represent a value for each entity type represented in the entity type data. For example, if the entity type data corresponds to song title, the entity value data may correspond to Water Under the Bridge. For further example, if the entity type data corresponds to artist, the entity value data may correspond to Adele. In another example, if the entity type data corresponds to album, the entity value data may correspond to 25. The canonicalization table look-up component 608 may be a key-value mapper that, for a given entity value, looks up a corresponding canonicalization table 610 for the entity type/intent and generates a canonical form(s) of the entity value. The canonicalization table look-up component 608 assumes the entity values in the canonicalization tables 610 are the canonical forms of the entities. The canonicalization tables 610 may include high precision human edited/added entity values. For example, the canonicalization tables 610 may include key value pairs provided by application developers. The system 100 may output entity value text data that causes an application server(s) 125 to generate incorrect results or error messages. Thus, the canonicalization tables 610 may include entity value text data associated with text data the application developer has indicated causes the application server(s) 125 to generate correct results. Illustrative key value pairs are illustrated in FIG. 2B. Since the data contained in the canonicalization tables 610 is highly specific and human generated, the canonicalization table look-up component 608 may not generate an output for each and every entity value input into the canonicalization table look-up component 608.

The canonicalizer 504 may further include an arbitration component 612. For a given entity, the arbitration component 612 may receive an output from the machine learning component 602, receive an output from the canonicalization table look-up component 608, and choose one of the outputs as a final canonical value for the given entity 614. Since the canonicalization tables 610 may include high precision human edited/added entity values, the arbitration component 612 may override the output of the machine learning component 602 (i.e., may ignore the output of the machine learning component 602) if the canonicalization table look-up component 608 generates an output. The entity canonical value 614 output by the arbitration component 612 may be the populated canonicalization field for a given entity in text data output by the canonicalizer 504.

Figure 7:
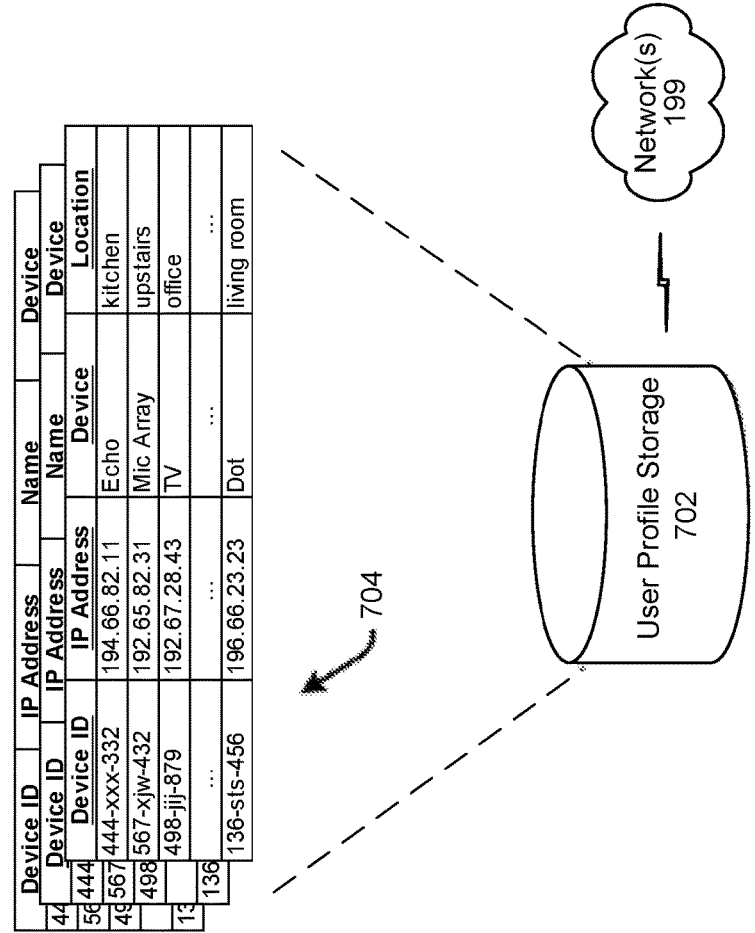
FIG. 7 illustrates data stored and associated with user profiles according to embodiments of the present disclosure.

FIG. 7 illustrates a user profile storage 702 that includes data regarding user accounts 704 as described herein. The user profile storage 702 may be located proximate to the server(s) 120, or may otherwise be in communication with various components, for example over the network(s) 199. The user profile storage 702 may include a variety of information related to individual users, accounts, etc. that interact with the system 100. For illustration, as shown in FIG. 7, the user profile storage 702 may include data regarding the devices associated with particular individual user accounts 704. In an example, the user profile storage 702 is a cloud-based storage. Each user profile 704 may include data such as device identifier (ID) data, speaker identifier (ID) data, voice profiles for users, internet protocol (IP) address data, name of device data, and location of device data for different devices. In addition, each user profile 704 may include data regarding the locations of individual devices (including how close devices may be to each other in a home, if the device location is associated with a user bedroom, etc.), address data, or other such information. Each user profile 704 may also include presence data for one of more devices, where the presence data indicates whether a user is near the device. Each user profile 704 may also include user settings, preferences, permissions, etc. For example, a particular user profile may indicate what specific users and/or devices are permitted to access the presence information for privacy protection purposes. The user profile 704 may also include indications as to which applications/intents are authorized to the user and thus may impact the processing of the canonicalizer 504 in determining which canonical forms may be more likely to correspond to an utterance.

FIGS. 8A through 8C illustrate the processing of a spoken command using entity resolution techniques involving canonicalization described herein. The speech-controlled device 110 receives (802) audio corresponding to a spoken utterances, and sends (804) audio data corresponding thereto to the server(s) 120 for processing.

The server(s) 120 performs (132) ASR on the audio data to generate text data. The server(s) 120 also parses and tags (134) portions of the text data to generate tagged text data. The server(s) 120 may also determine (136) one or more intents associated with the spoken utterance. For example, the server(s) 120 may determine the spoken utterance of "play Harry Potter and the Chamber of Secrets," corresponds to a play audio book intent or a play movie intent.

The server(s) 120 may generate (138) canonical forms for each tagged entity in the tagged text data. For example, the server(s) 120 may determine "Harry Potter and the Chamber of Secrets" is the only entity in the spoken utterance of "play Harry Potter and the Chamber of Secrets." Generation of the canonical forms may be specific to the determined intents. For a play audio book intent, the server(s) 120 may canonicalize "Harry Potter and the Chamber of Secrets" to "Harry Potter book 2," "second Harry Potter book," and "Chamber of Secrets." For a play movie intent, the server(s) 120 may canonicalize "Harry Potter and the Chamber of Secrets" to "Harry Potter movie 2," "second Harry Potter movie," and "Chamber of Secrets."

The server(s) 120 may determine (802 illustrated in FIG. 8B) a lexicon (e.g., a database of words) associated with each respective determined intent. For example, a play audio book intent may be associated with a first lexicon used for entity resolution, a play movie intent may be associated with a second lexicon used for entity resolution, etc. The server(s) 120 determines (804) a canonical form that matches a word or string of words in the lexicon(s). For example, if the server(s) 120 determines the spoken utterance corresponds to a play audio book intent as well as a play movie intent, the server(s) 120 compares canonical forms generated for the play audio book intent against the play audio book intent lexicon, and separately compares canonical forms generated for the play movie intent against the play movie intent lexicon. By matching a canonical form to a portion of the lexicon, the server(s) 120 can resolve the entity.

The server(s) 120 may then determine (806) an application server(s) 125 having access to or storing content responsive to the spoken utterance in view of the resolved entity/entities. The server(s) 120 sends (808 illustrated in FIG. 8C) signal requesting the content to the application server(s) 125. The server(s) 120 receives (810) content data from the application server(s) 125. If the content data is content text data, the server(s) 120 may perform (144) TTS on the content text data to generate content audio data. The server(s) 120 sends (146) the content audio data (either generated by TTS processing or as received from the application server(s) 125) to the speech-controlled device 110. The speech-controlled device 110 then outputs (812) audio corresponding to the content audio data.

FIG. 9 is a block diagram conceptually illustrating a user device that may be used with the described system. FIG. 10 is a block diagram conceptually illustrating example components of a remote device, such as the server(s) 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (904/1004), that may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive (MRAM) and/or other types of memory. Each device (110/120) may also include a data storage component (908/1008), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 918, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. The microphone 920 may be configured to capture audio. If an array of microphones is included, approximate distance to a sound's point of origin may be determined by acoustic localization based on time and amplitude differences between sounds captured by different microphones of the array.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment.

The device 110 and/or the server(s) 120 may include an ASR component 350. The ASR component 350 in the device 110 may be of limited or extended capabilities. The ASR component 350 may include the language models 354 stored in ASR model storage component 352. If limited speech recognition is included, the ASR component 350 may be configured to identify a limited number of words, whereas extended speech recognition may be configured to recognize a much larger range of words.

The device 110 and/or the server(s) 120 may include a limited or extended NLU component 360. The NLU component 360 in the device 110 may be of limited or extended capabilities. The NLU component 360 may comprise the name entity recognition component 362, the intent classification component 364, and/or other components. The NLU component 360 may also include a stored knowledge base and/or entity library, or those storages may be separately located.

The device 110 and/or the server(s) 120 may also include the command processor 390 configured to execute commands/functions associated with a spoken utterance as described herein.

As noted above, multiple devices may be employed in a single speech processing system. In such a multi-device system, each of the devices may include different components for performing different aspects of the speech processing. The multiple devices may include overlapping components. The components of the device 110 and the server(s) 120, as illustrated in FIGS. 9 and 10, are exemplary, and may be located as a stand-alone device or may be included, in whole or in part, as a component of a larger device or system.

Figure 11:
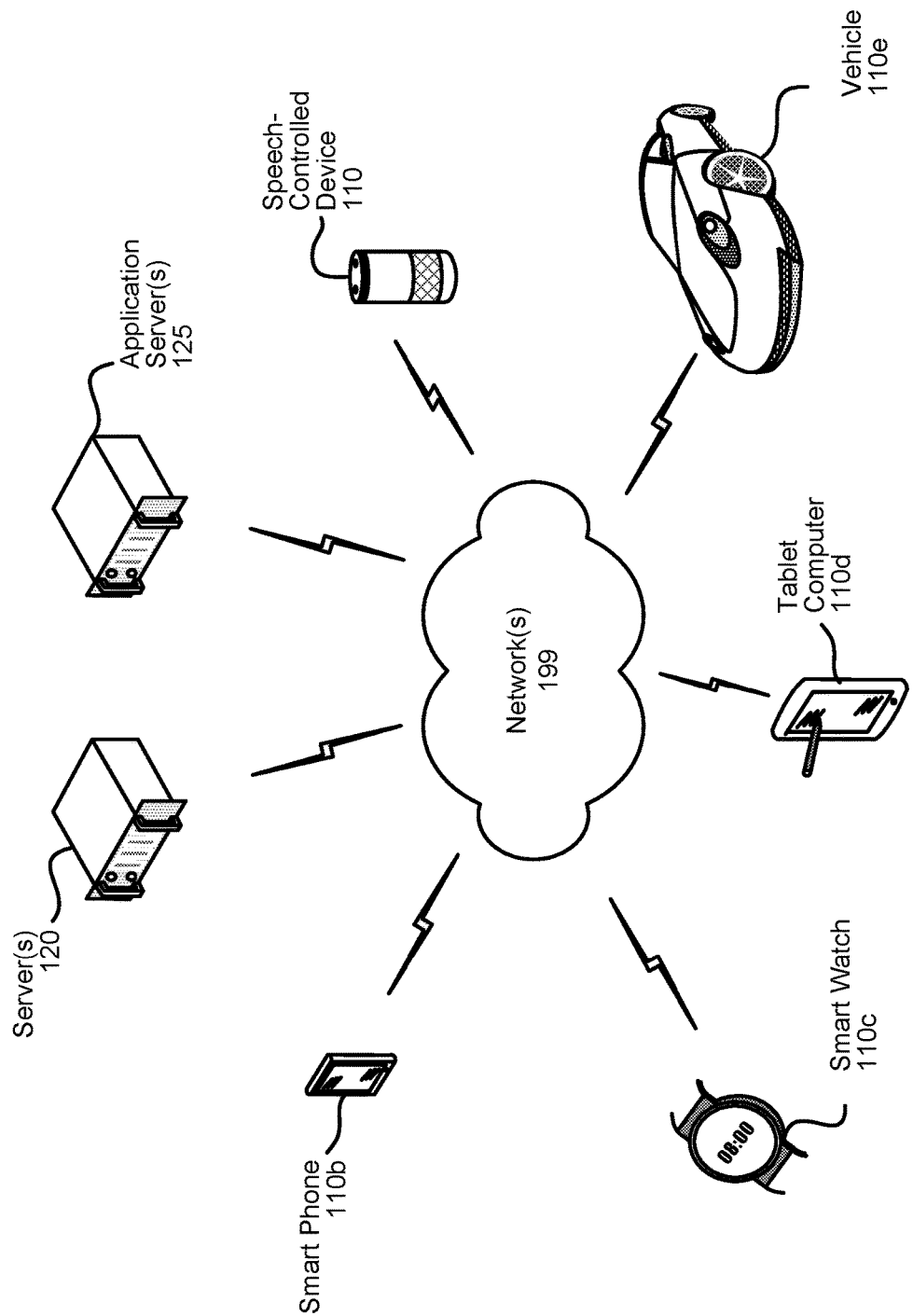
FIG. 11 illustrates an example of a computer network for use with the system.

As illustrated in FIG. 11, multiple devices (120, 110, 110b-110e) may contain components of the system 100 and the devices may be connected over a network(s) 199. The network(s) 199 may include a local or private network or may include a wide network such as the Internet. Devices may be connected to the network(s) 199 through either wired or wireless connections. For example, the speech-controlled device 110, a tablet computer 110d, a smart phone 110b, a smart watch 110c, and/or a vehicle 110e may be connected to the network(s) 199 through a wireless service provider, over a WiFi or cellular network connection, or the like. Other devices are included as network-connected support devices, such as the server(s) 120, application developer devices (e.g., the application server(s) 125), or others. The support devices may connect to the network(s) 199 through a wired connection or wireless connection. Networked devices may capture audio using one-or-more built-in or connected microphones or audio capture devices, with processing performed by ASR, NLU, or other components of the same device or another device connected via the network(s) 199, such as the ASR component 350, the NLU component 360, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 320, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computing system, comprising:
at least one processor; and
at least one memory including instructions that, when executed by the at least one processor, cause the computing system to:
receive text data corresponding to a command executable by the computing system;
determine, based at least in part on the text data, an intent corresponding to the command;
determine first text string data of the text data, the first text string data corresponding to an entity;
determine a lexicon associated with the intent;
determine, in the lexicon, second text string data corresponding to the entity, wherein the second text string data is different from the first text string data and the second text string data corresponds to a recognized format for referring to the entity with respect to the intent; and
cause an action to be executed for the intent using the second text string data.

2. The computing system of claim 1, wherein the at least one memory further includes instructions that, when executed by the at least one processor, further cause the computing system to:
perform, with respect to the first text string data, at least one of case normalization, punctuation addition, punctuation removal, white space addition, white space removal, word level substring matching, phonetic level substring matching, number-to-text mapping, text-to-number matching, or acronym generation.

3. The computing system of claim 1, wherein the at least one memory further includes instructions that, when executed by the at least one processor, further cause the computing system to:
determine, based at least in part on the text data, a second intent potentially corresponding to the command;
determine a second lexicon associated with the second intent;
determine, in the second lexicon, third text string data corresponding to the entity, wherein the third text string data is different from the first text string data; and
cause one of the action to be executed for the intent using the second text string data or a second action to be executed for the second intent using the third text string data.

4. The computing system of claim 1, wherein the at least one memory further includes instructions that, when executed by the at least one processor, further cause the computing system to:
determine an entity type corresponding to the entity; and
determine, in the lexicon, the second text string data corresponding to the entity type.

5. The computing system of claim 1, wherein the second text string data includes the first text string data.

6. The computing system of claim 1, wherein the at least one memory further includes instructions that, when executed by the at least one processor, further cause the computing system to:
append the second text string data to the first text string data.

7. The computing system of claim 1, wherein the at least one memory further includes instructions that, when executed by the at least one processor, further cause the computing system to:
using a trained model, process the first text string data, a first indicator corresponding to the intent, and a second indicator corresponding to an entity list to determine the second text string data.

8. The computing system of claim 1, wherein the at least one memory further includes instructions that, when executed by the at least one processor, further cause the computing system to:
receive, from an application developer device, word string data;
store the word string data in a look-up table associated with a first application;
determine the first text string data is represented in third text string data included in the look-up table; and
cause the action to be executed using the third text string data.

9. A computer-implemented method, comprising:
receiving text data corresponding to a command executable by a computing system;
determining, based at least in part on the text data, an intent corresponding to the command;
determining first text string data of the text data, the first text string data corresponding to an entity;
determining a lexicon associated with the intent;
determining, in the lexicon, second text string data corresponding to the entity, wherein the second text string data is different from the first text string data and the second text string data corresponds to a recognized format for referring to the entity with respect to the intent; and
causing an action to be executed for the intent using the second text string data.

10. The computer-implemented method of claim 9, wherein determining the second text string data comprises:
performing, with respect to the first text string data, at least one of case normalization, punctuation addition, punctuation removal, white space addition, white space removal, word level substring matching, phonetic level substring matching, number-to-text mapping, text-to-number matching, or acronym generation.

11. The computer-implemented method of claim 9, further comprising:
determining, based at least in part on the text data, a second intent potentially corresponding to the command;
determining a second lexicon associated with the second intent;
determining, in the second lexicon, third text string data corresponding to the entity, wherein the third text string data is different from the first text string data; and
causing one of the action to be executed for the intent using the second text string data or a second action to be executed for the second intent using the third text string data.

12. The computer-implemented method of claim 9, further comprising:
determining an entity type corresponding to the entity; and
determining, in the lexicon, the second text string data corresponds to the entity type.

13. The computer-implemented method of claim 9, wherein the second text string data includes the first text string data.

14. The computer-implemented method of claim 9, further comprising:
appending the second text string data to the first text string data.

15. The computer-implemented method of claim 9, further comprising:

using a trained model, processing the first text string data, a first indicator corresponding to the intent, and a second indicator correspond to an entity list to determine the second text string data.

16. The computer-implemented method of claim 9, further comprising:
receiving, from an application developer device, word string data;
storing the word string data in a look-up table associated with a first application;
determining that the first text string data is represented in third text string data included in the look-up table; and
causing the action to be executed using the third text string data.

17. A computing system, comprising:
at least one processor; and
at least one memory including instructions that, when executed by the at least one processor, cause the computing system to:
receive text data corresponding to a command executable by the computing system;
determine, based at least in part on the text data, an intent corresponding to the command;
determine first text string data of the text data, the first text string data corresponding to an entity;
determine a lexicon associated with the intent;
determine, in the lexicon, second text string data corresponding to the entity, wherein the second text string data is different from the first text string data;
receive, from an application developer device, word string data;
store the word string data in a look-up table associated with a first application; and
cause an action to be executed for the intent using the second text string data and third text string data.

18. The computing system of claim 17, wherein the at least one memory further includes instructions that, when executed by the at least one processor, further cause the computing system to:
perform, with respect to the first text string data, at least one of case normalization, punctuation addition, punctuation removal, white space addition, white space removal, word level substring matching, phonetic level substring matching, number-to-text mapping, text-to-number matching, or acronym generation.

19. The computing system of claim 17, wherein the at least one memory further includes instructions that, when executed by the at least one processor, further cause the computing system to:
determine an entity type corresponding to the entity; and
determine, in the lexicon, the second text string data corresponding to the entity type.

20. The computing system of claim 17, wherein the at least one memory further includes instructions that, when executed by the at least one processor, further cause the computing system to:
append the second text string data to the first text string data.

* * * * *